United States Patent
Hardy et al.

(10) Patent No.: US 11,597,318 B2
(45) Date of Patent: Mar. 7, 2023

(54) APPARATUS AND METHOD FOR DISPLAYING INFORMATION

(71) Applicant: Jaguar Land Rover Limited, Coventry (GB)

(72) Inventors: Robert Hardy, Coventry (GB); Sebastian Paszkowicz, Coventry (GB); Lee Skrypchuk, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 15/301,791

(22) PCT Filed: Oct. 7, 2014

(86) PCT No.: PCT/EP2014/071477
§ 371 (c)(1),
(2) Date: Oct. 4, 2016

(87) PCT Pub. No.: WO2015/154826
PCT Pub. Date: Oct. 15, 2015

(65) Prior Publication Data
US 2017/0182942 A1    Jun. 29, 2017

(30) Foreign Application Priority Data
Apr. 9, 2014 (GB) ..................... 1406405

(51) Int. Cl.
*B60R 1/00* (2022.01)
*G02B 27/01* (2006.01)
*H04N 7/18* (2006.01)

(52) U.S. Cl.
CPC ............ *B60R 1/00* (2013.01); *G02B 27/0101* (2013.01); *B60K 2370/21* (2019.05);
(Continued)

(58) Field of Classification Search
CPC ........ G02B 27/0101; G02B 2027/0138; G02B 2027/014; B60R 1/00; B60R 2300/105;
(Continued)

(56) References Cited

U.S. PATENT DOCUMENTS 6,332,003 B1 * 12/2001 Matsuura ............... H04N 19/30
375/240.23
9,387,813 B1 * 7/2016 Moeller .................. B60R 11/04
(Continued)

FOREIGN PATENT DOCUMENTS

CN        1787636 A     6/2006
CN     101277432 A    10/2008
(Continued)

OTHER PUBLICATIONS

Chinese Office Action Corresponding to Chinese Patent Application No. 2017122101930550 (Foreign Text, 10 Pages, English Translation Thereof, 8 Pages) (dated Dec. 26, 2017).
(Continued)

*Primary Examiner* — Hesham K Abouzahra
(74) *Attorney, Agent, or Firm* — McCoy Russell LLP

(57) ABSTRACT

Embodiments of the present invention provide a display method for use in vehicle, comprising obtaining information (step 210) associated with a vehicle or image data for a region ahead of the vehicle, and displaying (step 230) one or more of a graphical representation of at least one component of the vehicle having one or more characteristics based on the information associated with the vehicle, or a representation of the image data, wherein the representation is arranged to overlie a portion of the vehicle (320) to be indicative of a portion of the vehicle being at least partly transparent.

14 Claims, 8 Drawing Sheets

Prior Art

(52) U.S. Cl.
CPC .... *B60K 2370/27* (2019.05); *B60K 2370/334* (2019.05); *B60K 2370/52* (2019.05); *B60K 2370/77* (2019.05); *B60R 2300/105* (2013.01); *B60R 2300/205* (2013.01); *B60R 2300/302* (2013.01); *B60R 2300/303* (2013.01); *G02B 2027/014* (2013.01); *G02B 2027/0138* (2013.01); *H04N 7/181* (2013.01)

(58) Field of Classification Search
CPC ........ B60R 2300/205; B60R 2300/302; B60R 2300/303; B60K 2370/27; B60K 2370/52; B60K 2370/21; B60K 2370/334; B60K 2370/77; H04N 7/181
See application file for complete search history.

(56) References Cited

U.S. PATENT DOCUMENTS

| | | | |
|---|---|---|---|
| 2003/0108222 A1 | 6/2003 | Sato et al. | |
| 2008/0310675 A1* | 12/2008 | O'Brien | G06T 19/00 382/100 |
| 2009/0009314 A1* | 1/2009 | Taniguchi | B60R 1/00 340/461 |
| 2011/0052042 A1 | 3/2011 | Ben Tzvi | |
| 2011/0157317 A1* | 6/2011 | Kamiya | H04N 5/23296 348/47 |
| 2012/0113261 A1* | 5/2012 | Satoh | B60R 1/00 348/148 |
| 2012/0169513 A1* | 7/2012 | Szczerba | G02B 27/01 340/905 |
| 2012/0174004 A1 | 7/2012 | Seder et al. | |
| 2012/0242834 A1* | 9/2012 | Satoh | G06T 11/00 348/148 |
| 2013/0144482 A1 | 6/2013 | Tuukkanen | |
| 2013/0293582 A1 | 11/2013 | Ng-Thow-Hing et al. | |
| 2013/0300872 A1 | 11/2013 | Park | |
| 2013/0342427 A1* | 12/2013 | Cai | G06K 9/00805 345/4 |
| 2015/0138360 A1* | 5/2015 | Kowatari | B60R 1/00 348/148 |
| 2016/0227098 A1* | 8/2016 | Yasuhara | H04N 5/23206 |
| 2017/0274822 A1* | 9/2017 | Haggerty | B60R 1/00 |

FOREIGN PATENT DOCUMENTS

| | | |
|---|---|---|
| CN | 101327763 A | 12/2008 |
| CN | 102196217 A | 9/2011 |
| CN | 102448773 A | 5/2012 |
| CN | 102474596 A | 5/2012 |
| CN | 102941823 A | 2/2013 |
| CN | 103237685 A | 8/2013 |
| CN | 103679698 A | 3/2014 |
| DE | 10 2005 048 336 A1 | 4/2007 |
| DE | 10 2008 028 303 A1 | 1/2009 |
| EP | 2 045 132 A2 | 4/2009 |
| EP | 2 660 104 A2 | 11/2013 |
| JP | 2008042235 A | 2/2008 |
| JP | 2008308076 A | 12/2008 |
| JP | 2009056848 A | 3/2009 |
| JP | 1258048 B2 | 4/2009 |
| JP | 2009184610 A | 8/2009 |
| JP | 2010109684 A | 5/2010 |
| JP | 2010114618 A | 5/2010 |
| JP | 2010118935 A | 5/2010 |
| WO | WO 2012/028230 A1 | 3/2012 |
| WO | WO 2013/053438 A2 | 4/2013 |
| WO | WO 2013058049 A1 | 4/2013 |
| WO | WO 2013/172172 A1 | 11/2013 |

OTHER PUBLICATIONS

Japanese Office Action Corresponding to Japanese Patent Application No. 2016-561710 (Foreign Text, 4 Pages, English Translation Thereof, 2 Pages) (dated Jan. 9, 2018).
Combined Search and Examination Report, GB Application No. 1406405.9, dated Oct. 14, 2014, 7 pages.
Combined Search and Examination Report, GB Application No. 1417738.0, dated Mar. 17, 2015, 7 pages.
Notification of Transmittal of the International Search Report and the Written Opinion of the International Searching Authority, or the Declaration, PCT/EP2014/071477, dated Jan. 12, 2015, 10 pages.
Fourth Office Action and English language translation, CN Patent Application No. 201480077725.9, dated Aug. 21, 2019, 24 pp.
European Search Report, EP20160751.2, dated Jun. 17, 2020, 6 pages.
State Intellectual Property Office of the People's Republic of China, Office Action and Search Report Issued in Application No. 202010168279.X, Nov. 4, 2022, 21 pages. (Submitted with Partial Translation).

* cited by examiner even when the representation is not spatially aligned with the region ahead of the vehicle.

APPARATUS AND METHOD FOR DISPLAYING INFORMATION

RELATED APPLICATIONS

This application is a 35 U.S.C. § 371 national stage application of PCT Application No. PCT/EP2014/071477, filed on Oct. 7, 2014, which claims priority from Great Britain Patent Application No. 1406405.9 filed on Apr. 9, 2014, the contents of which are incorporated herein by reference in their entireties. The above-referenced PCT International Application was published in the English language as International Publication No. WO 2015/154826 A1 on Oct. 15, 2015.

TECHNICAL FIELD

The present disclosure relates to a display method for use in a vehicle and a display apparatus for use in a vehicle.

BACKGROUND

It is important for a driver of a vehicle to be provided with information to drive the vehicle safely and accurately. Information provided to the driver includes a view from the vehicle, in particular, ahead or forward of the vehicle, and also information concerning the vehicle such as a speed of the vehicle. In some vehicles, such as sports utility vehicles (SUVs) or 4 wheel drive vehicles, the view ahead of the vehicle is partially obscured by a bonnet or hood of the vehicle, particularly a region a short distance ahead of the vehicle. This can be exacerbated by the vehicle being on an incline or at a top of a descent, such as when driving off-road.

It is an object of embodiments of the invention to aid a driver of a vehicle. It is an object of embodiments of the invention to improve a driver's view ahead of a vehicle and/or to provide information associated with the vehicle in a convenient manner. It is an object of embodiments of the invention to at least mitigate one or more of the problems of the prior art.

SUMMARY OF THE INVENTION

According to a first aspect of the present invention there is provided a display method for use in a vehicle, comprising displaying one or more of a graphical representation of at least one component of the vehicle and a representation of image data, wherein the representation is arranged indicative of a view obscured by the vehicle.

According to an aspect of the present invention there is provided a display method for use in a vehicle, comprising obtaining information associated with a vehicle or image data for a region ahead of the vehicle, and displaying one or more of a graphical representation of at least one component of the vehicle having one or more characteristics based on the information associated with the vehicle, or a representation of the image data, wherein the one or more representation is arranged to overlie a portion of the vehicle to be indicative of a portion of the vehicle being at least partly transparent. Advantageously this allows a view behind a portion of a vehicle or a representation of a component of the vehicle, such as the vehicle wheels to be observed. This allows the viewer to perceive details hidden from view by the vehicle or parts of the vehicle which are normally obscured.

The representation may be translucently displayed. Advantageously this allows the vehicle still to be observed so the position of the vehicle can be appreciated.

The representation may be arranged to overlie an external portion of the vehicle. The external portion may be a bonnet of the vehicle. Advantageously this allows a region around the vehicle wheels to be observed.

The representation may be arranged to overlie the portion of the vehicle at least from a point of view of a driver of the vehicle. Advantageously this allows the driver to have increased information from which to drive the vehicle.

The representation may be scaled, for example reduced or enlarged, prior to being displayed. Notwithstanding the above, the scaled representation continues to provide increased information with which to drive the vehicle, albeit without direct registration with a corresponding component on the vehicle or a region ahead of the vehicle.

The representation may be displayed on a head-up display means.

The representation may be arranged to overlie an interior portion of the vehicle. Advantageously this provides improved awareness around the vehicle.

The interior portion of the vehicle may comprise one or more of a dashboard of the vehicle and a door of the vehicle.

The method may comprise projecting the representation onto the interior portion of the vehicle. Advantageously this allows the representation to be displayed on a variety of surfaces located about the interior.

The information associated with the vehicle may be information associated with the at least one component of the vehicle. Advantageously the representation may accurately depict a state of the component.

The at least one component of the vehicle may comprise a steering system of the vehicle, one or more wheels of the vehicle, a suspension of the vehicle or an engine of the vehicle. Advantageously normally obscured components may be appreciated.

The information associated with the vehicle may be obtained from a communication bus of the vehicle.

The image data may be obtained from one or more cameras associated with the vehicle.

One or more of the, cameras may be arranged to view forward of the vehicle.

One or more of the cameras may be arranged to view a region a predetermined distance ahead of the vehicle.

The one or more cameras may be arranged to view in a generally downward direction. Advantageously this allows ground features to be observed in the representation.

The method may comprise processing the image data such that the representation of the image data is generally aligned with a view from the vehicle. Advantageously this allows an actual view to correspond with the representation.

The view from the vehicle may be driver's view from the vehicle. The driver's view may be determined from image data of the driver.

The representation of the image data may be displayed so as to substantially spatially align with the region ahead of the vehicle from a point of view of an occupant within the vehicle, optionally the driver of the vehicle.

Alternatively, or in addition, at least part of the representation of the image data may be scaled, for example reduced or enlarged, prior to being displayed. In this case the scaled portion of the representation of the image data may not substantially spatially align with the region ahead of the vehicle from a point of view of an occupant within the vehicle. Notwithstanding the above, the scaled representation of the image data still enables ground features to be observed in the representation, albeit without direct registration with the region in the environment ahead of the vehicle.

The method may comprise processing the image data to introduce a delay into at least a portion of the image data. Advantageously this allows a location of a downward image to correspond to a current location of the vehicle.

The method may comprise determining the delay based on information associated with the vehicle, optionally the information is indicative of a speed of the vehicle.

According to another aspect of the present invention there is provided a display apparatus for use with a vehicle, comprising a display means arranged to display information such that the displayed information overlies a portion of the vehicle, and a processing means arranged to determine information associated with the vehicle or to receive image data for a region ahead of the vehicle and to cause the display means to display one or more of a graphical representation of at least one component of the vehicle having one or more characteristics based on the information associated with the vehicle, or a representation of the image data.

The display means may be arranged to translucently display information thereon.

The display means may be arranged to translucently display the representation so that the portion of the vehicle's body is partly visible.

The display means may be arranged to display the representation to overlie at least a portion of a bonnet of the vehicle.

The representation may be displayed to overlie the portion of the vehicle from a point of view of a driver of the vehicle.

The representation may be scaled, for example reduced or enlarged, prior to being displayed. Notwithstanding the above, the scaled representation continues to provide increased information with which to drive the vehicle, albeit without direct registration with a corresponding component on the vehicle or a region ahead of the vehicle.

The display means may comprise a head up display.

The display means may comprise a projection means arranged to project at least a portion of the representation onto an interior of the vehicle.

The information associated with the vehicle may be information associated with the at least one component of the vehicle.

The at least one component of the vehicle may comprise a steering system of the vehicle, one or more wheels of the vehicle, a suspension of the vehicle or an engine of the vehicle.

The apparatus may comprise one or more cameras arranged to output the image data.

One or more cameras may be are arranged to view ahead of the vehicle.

One or more cameras may be arranged to view a region a predetermined distance ahead of the vehicle.

The processing means may be arranged to process the image data such that the representation of the image data is generally aligned with a view from the vehicle.

The view from the vehicle may be a driver's view from the vehicle.

The processing means may be arranged to receive image data of the driver and to determine the driver's view based thereon.

The representation of the image data may be displayed so as to substantially spatially align with the region ahead of the vehicle from a point of view of an occupant within the vehicle, optionally the driver of the vehicle.

Alternatively, or in addition, at least part of the representation of the image data may be scaled, for example reduced or enlarged, prior to being displayed. In this case the scaled portion of the representation of the image data may not substantially spatially align with the region ahead of the vehicle from a point of view of an occupant within the vehicle. Notwithstanding the above, the scaled representation of the image data still enables ground features to be observed in the representation, albeit without direct registration with the region in the environment ahead of the vehicle.

The processing means may be arranged to process the image data to introduce a delay into the representation of the image data.

The head up display may be arranged in a lower portion of a windscreen of the vehicle.

According to an aspect of the invention there is provided a vehicle comprising an apparatus according to an aspect of the invention or arranged to execute a method according to an aspect of the invention.

BRIEF DESCRIPTION OF THE DRAWINGS

Embodiments of the invention will now be described by way of example only, with reference to the accompanying figures, in which.

DETAILED DESCRIPTION

Figure 1:
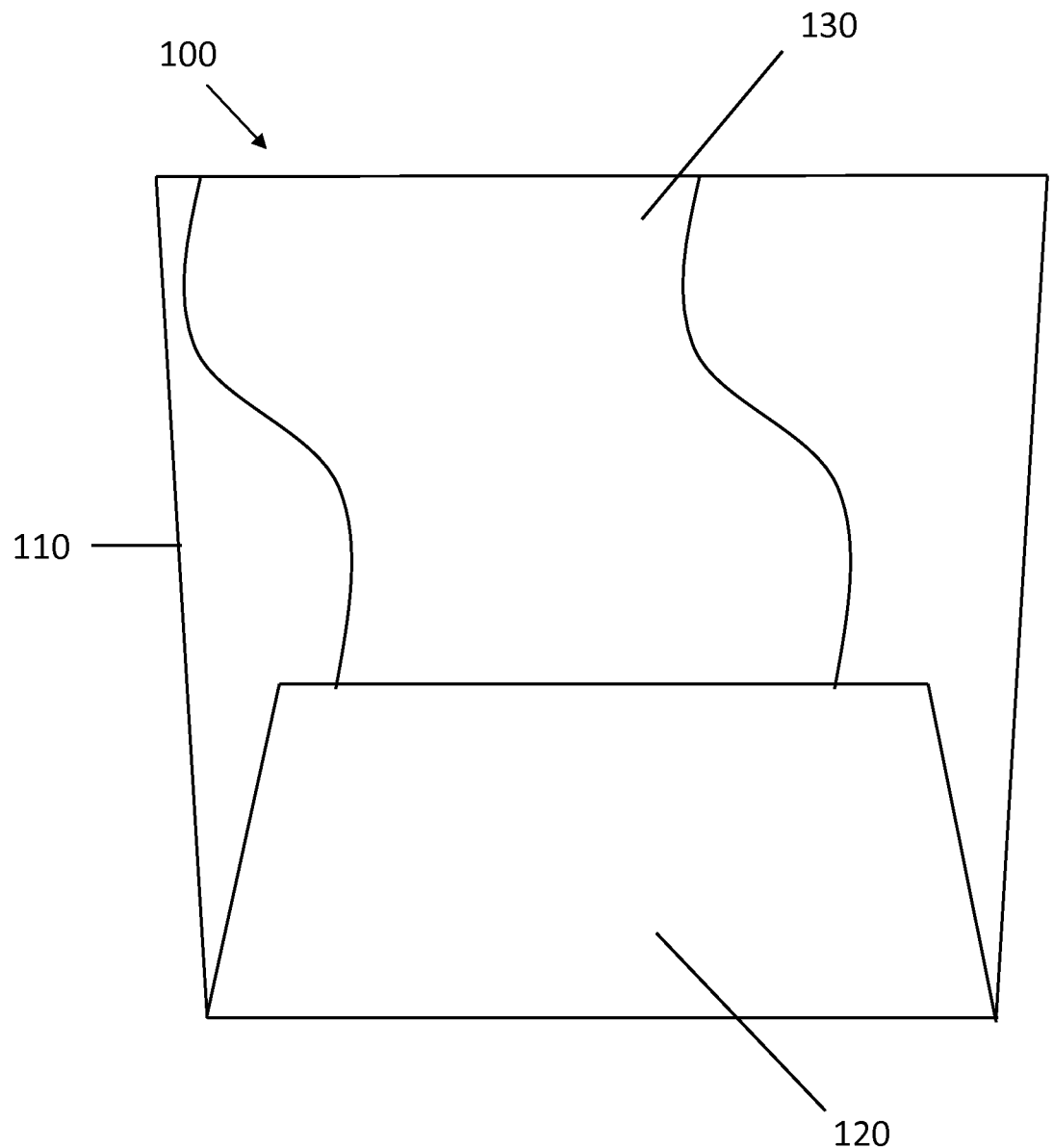
FIG. 1 shows an illustration of a typical view from a conventional vehicle.

FIG. 1 illustrates a typical view 100 from a conventional vehicle. The view is from an interior of the vehicle through a windscreen or windshield 110 of the vehicle viewing forwards. A portion of a bonnet or hood 120 of the vehicle is visible extending forward from beneath the windscreen 110. The vehicle is travelling along a roadway 130 which is visible from the vehicle. As can be appreciated, the bonnet 120 obscures the view of the roadway 130 close the vehicle. This problem is exacerbated when the vehicle is inclined with respect to the roadway 130 ahead of the vehicle i.e. when an angle between the vehicle and the roadway ahead is increased, such as when the vehicle is at a top of a descent (not yet descending a slope) or is inclined upward on a small undulation. In these situations the roadway 130 may have reduce visibility from the vehicle particularly due to being obscured by the bonnet 120.

Figure 2:
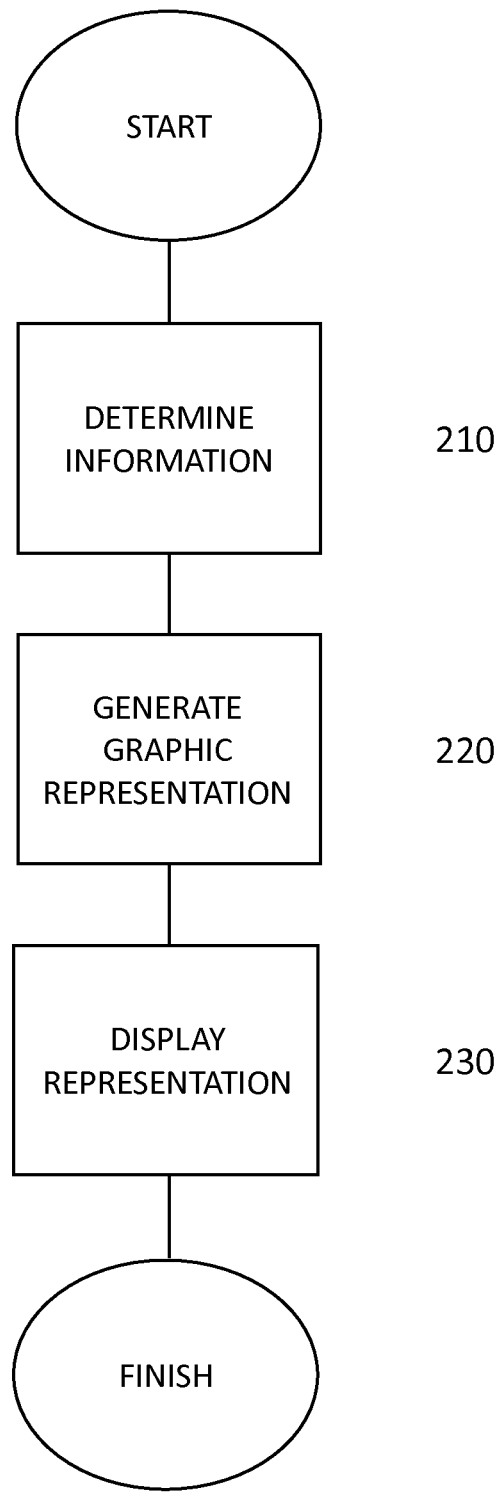
FIG. 2 shows a method according to an embodiment of the invention.
Figure 3:
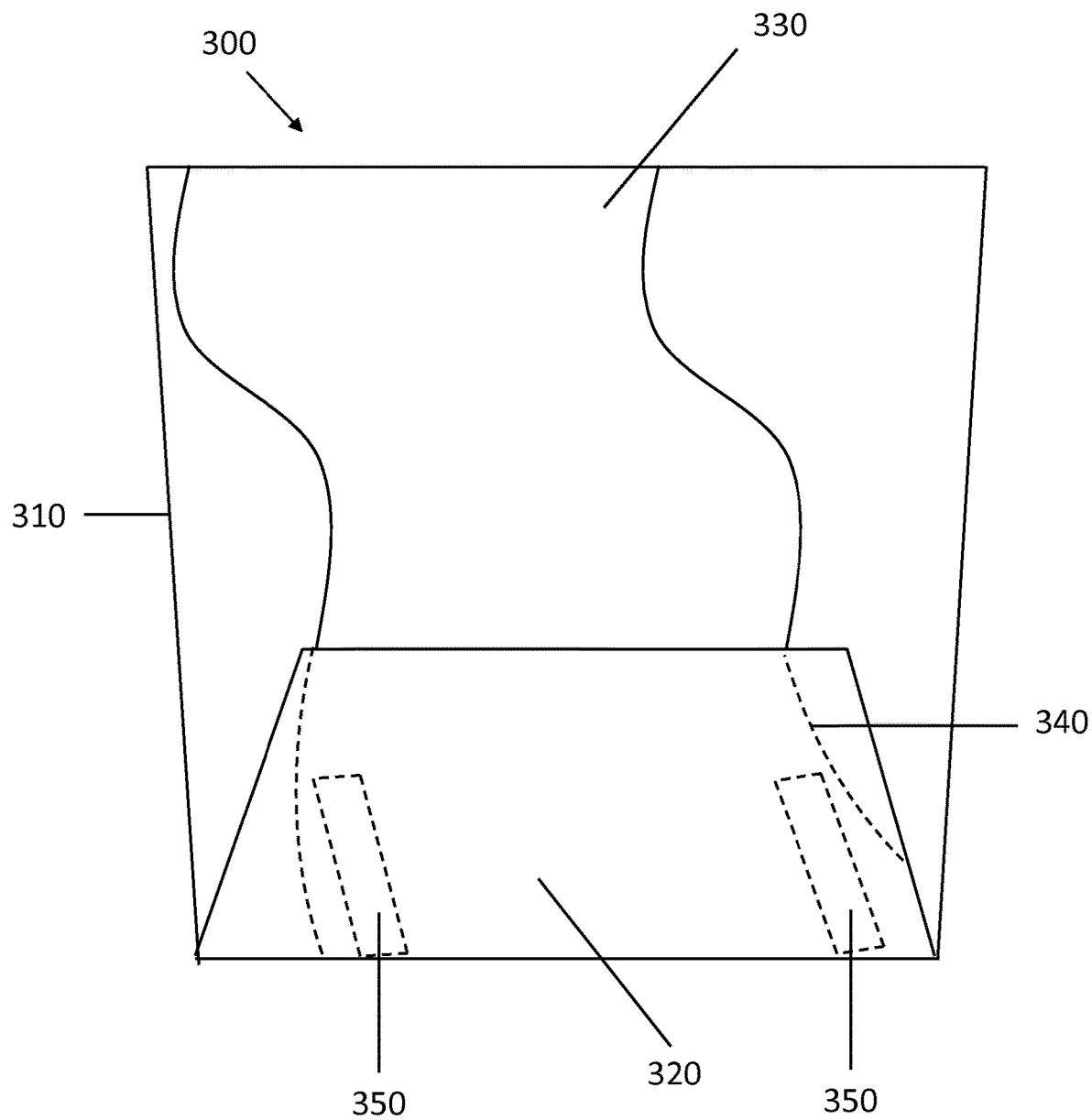
FIG. 3 shows an illustration of a view from a vehicle according to an embodiment of the invention.

FIG. 2 illustrates a method 200 according to an embodiment of the invention which will be explained with reference to FIG. 3. The method 200 is a display method for use in a vehicle. The vehicle may be a land-going vehicle, such as a wheeled vehicle. FIG. 3 illustrates a view 300 from a vehicle according to an embodiment of the invention. The view 300 is from an interior of the vehicle through a windscreen or windshield 310 of the vehicle viewing forwards, as in FIG. 1. A portion of a bonnet or hood 320 of the vehicle is visible extending forward from beneath the windscreen 310.

The vehicle shown in FIG. 3 comprises a display means which is arranged to display information 340, 350 thereon. The information 340, 350 is displayed so as to overlie a portion of the vehicle. The displayed information is representative of the vehicle being at least partly transparent. That is, the information is representative of a view of the passenger if the vehicle was to be at least partly transparent, as will be explained. The information provides a representation of a line of sight through the vehicle.

As shown in FIG. 3, the information 340, 350 is displayed to overlie a portion of the vehicle's body, in this case the bonnet 320 of the vehicle. It will be realised that the information 340, 350 may be displayed to overlie other portions of the vehicle's body. The display means may be arranged to display the information 340, 350 to overlie an external and/or internal portion of the vehicle, as will be explained in more detail. The information 340, 350 is arranged to overlie the bonnet 320 of the vehicle from a point of view of a passenger of the vehicle, such as the driver. The display means may be arranged to translucently display information 340, 350 thereon such that the portion of the vehicle body may still be perceived, at least faintly, underneath the displayed information.

As will be explained with reference to FIG. 5, in one embodiment the display means may comprise a means for displaying information in a head-up manner to at least the driver of the vehicle. In one embodiment the display means may comprise an optical combiner, for example formed by a transparent, generally planar, material arranged, in use, to display the information 340, 350. The information 340, 350 may be projected onto the combiner, which may form part of, or consist of, the windscreen 310 in some embodiments. The combiner may be arranged in at least a lower region of the windscreen 310 so as to display the information 340, 350 to overlie the bonnet 320 of the vehicle. By overlie it is meant that the displayed information 340, 350 appears upon (or in front of) the bonnet 320. In other words, the bonnet 320 is located behind the displayed information 340, 350. The information 340, 350 may be displayed translucently so that the viewer is able to perceive the bonnet 320 through the information 340, 350, for example to determine the location of the bonnet 320 and front of the vehicle.

In another embodiment the means for displaying information in a head-up manner forms part of one or more windows of the vehicle, such as the windscreen 310 of the vehicle. The one or more windows comprises transparent image forming means such as electronic components integrated within glass, or other transparent material, of the windows. The electronic components may comprise transparent light emitting devices such as organic light-emitting diodes arranged to output an image from the transparent material.

The display means may further comprise a projection means. The projection means may be arranged to project an image onto an interior of the vehicle, such as onto a dashboard, door interior, or other interior components of the vehicle. The projection means may comprise a laser device for projecting the image onto the vehicle interior.

The method 200 comprises a step 210 of obtaining information associated with the vehicle, or image data. The information or image data may be obtained by a processing means, such as a processing device, of an embodiment of the invention.

The information associated with the vehicle may be associated with one of a steering system of the vehicle, one or more wheels of the vehicle or suspension of the vehicle. It will be realised that the information may be associated with other components or systems of the vehicle. In the described example the information is associated with the wheels of the vehicle and, in particular, a steering angle of the wheels, although it will be realised that this is merely an example. The information may be obtained by the processing device from one or more steering angle sensors.

The information may be obtained by the processing device receiving information from a communication bus of the vehicle, such as a CAN bus, although the communication bus may be based on other protocols such as Ethernet.

The image data may be for a region ahead of the vehicle. The image data may be obtained by the processing device from one or more image sensing means, such as cameras, associated with the vehicle. As will be explained a camera may be mounted upon a front of the vehicle to view forwards there-from in a driving direction of the vehicle. The camera may be arranged so as to obtain image data corresponding to a view of a passenger, such as the driver, without the bonnet 320 being present. That is, the camera may output image data that would be perceived by the driver if the bonnet 320 was not present i.e. not obstructing the driver's view. The camera may be mounted at a front of the vehicle lower than a plane of the bonnet 320, such as behind a grill of the vehicle. It will be realised that the camera may be mounted in other locations, as will be explained. Furthermore the camera may, in some embodiments be moveably mounted. In one embodiment the camera may be moveably mounted. The moveably mounted camera may be arranged to rotate about an axis such that a viewing angle of the camera is vertically controllable. A vertical position of the camera may also be controlled. The moveable camera may be arranged to view in a substantially constant horizontal axis regardless of an inclination of the vehicle. For example the camera may be arranged to view generally horizontally even when the vehicle is inclined. However it will be appreciated that the camera may be arranged to be oriented non-horizontally. The camera may be arranged to have a generally constant downward orientation so as to view, and provide image data corresponding to, a region forward of the vehicle which is obscured from the driver's view by the bonnet 320. The region may be a region which is up to 10 or 20 m ahead of the vehicle, although it will be realised that these distances are merely examples.

In step 220 a graphical representation of at least one component of the vehicle having one or more characteristics based on the information associated with the vehicle, and/or a representation of the image data is generated. The representation, of either the at least one component or based on the image data, may be generated by the processing device.

The representation, particularly of the image data obtained in step 210 although also of the at least one component, may be generated so as to match, or correspond to, a perspective from a point to view of a passenger in the vehicle, such as the driver. For example, an image processing operation may be performed on the image data received in step 210 to adjust a perspective of the image data. The perspective may be adjusted to match, or to be closer to, a perspective of a subject of the image data as viewed from the driver's position within the vehicle.

Alternatively, or in addition, the representation of the image data or the at least one component is scaled, for example reduced or enlarged, prior to being displayed. The scaled representation continues to convey useful information to the driver, albeit without direct registration with a region in the environment ahead of the vehicle or with a location of a component within the vehicle.

Additionally or alternatively the image processing operation may include a delay being introduced into the image data. The delay time may be based upon a speed of travel of the vehicle. The delay may allow the displayed representation based on the image data to correspond to a current location of the vehicle. For example, if the image data is for a location around 20 m ahead of the vehicle the delay may allow the location of the vehicle to approach the location of the image data such that, when the representation is displayed, the location corresponding to the image data is that which is obscured from the passenger's view by the bonnet 320. In this way the displayed representation matches a current view of the passenger.

The image processing operation may be performed by the processing device.

In step 230 the representation is displayed. The representation is displayed so as to overlie a portion of the vehicle's body from the viewer's point of view. The viewer may be the driver of the vehicle. As noted above, the representation may be translucently displayed such that features underneath or behind the displayed representation, such as the bonnet 320, may still be perceived, even faintly.

The method 200 may be performed continually in a loop until a predetermined event occurs, such as a user interrupting the method, for example by activating a control within the vehicle. It will be realised that the predetermined event may be provided from other sources.

Figure 4:
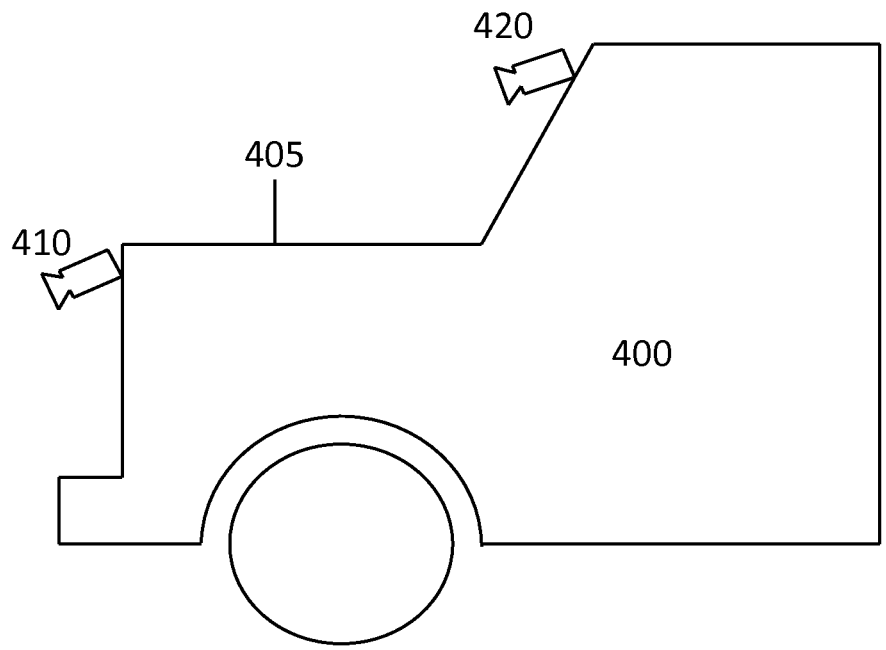
FIG. 4 shows an illustration of a vehicle according to an embodiment of the invention.

FIG. 4 illustrates a front portion of a vehicle 400 in side-view. The vehicle 400 comprises one or more cameras 410, 420. The cameras are arranged to output image data corresponding to a location ahead of the vehicle 400. It will be appreciated that the vehicle 400 may only comprise one camera 410, 420, or may comprise two or more cameras 410, 420 from which a representation of the image data provided thereby is generated. A camera 410 may be located at a front of the vehicle 400 lower than a plane of a bonnet 405 of the vehicle 400, as described above. A camera 420 may be located at a location above the plane of the bonnet 405 such as at a location generally at an upper region of the vehicle's windscreen. As noted above, the one or more cameras may be arranged to view generally downward in order to output image data for a portion of ground ahead of the vehicle's current location.

Figure 5:
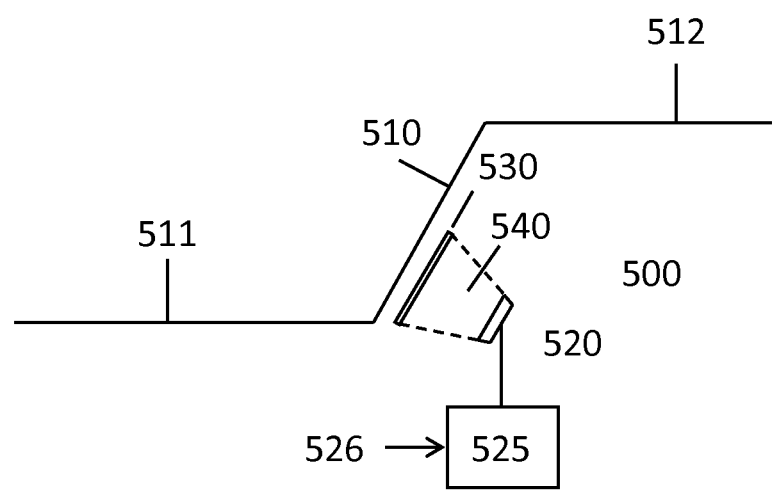
FIG. 5 shows an illustration of a display apparatus according to an embodiment of the invention.

FIG. 5 illustrates a display apparatus 500 according to an embodiment of the invention. The display apparatus 500 may be provided in a vehicle according to an embodiment of the invention. FIG. 5 illustrates a portion of the vehicle in side-cross section where the vehicle portion comprises a bonnet 511, a windscreen 510 and a roof 512 of the vehicle.

The apparatus 500 comprises a display device 520, 530 arranged to display information thereon so as to overlie a portion of the vehicle and a processing device 525 arranged to determine information associated with a vehicle, or to receive image data for a region ahead of the vehicle, and to cause the display device to display a graphical representation of at least one component of the vehicle having one or more characteristics based on the information associated with the vehicle, or a representation of the image data.

As described above, the processing device 525 is arranged to receive 526 the information associated with the vehicle, such as a steering angle of the vehicle's wheels, or image data output by one or more cameras 410, 420. The information or image data may be received by the processing device 525 from a communication bus of the vehicle, or via a dedicated communication channel such as a video feed from the one or more cameras 410, 420.

The processing device 525 is arranged to generate a graphic representation based on the information or the image data. For example, the graphic representation may be a representation of the vehicle's wheels 350 as shown in FIG. 3, although the representation may be of other components of the vehicle such as a suspension system, axle of the vehicle, an engine of the vehicle, or any other generally mechanical component of the vehicle. The processing device 525 may perform one or more image processing operations on the representation, such as altering a perspective of the image data, scaling the image data, and/or introducing a delay to the image data as described above. The perspective of the image data may be altered to match a viewing angle of an occupant of the vehicle, such as the driver. The processing device may be arranged to receive image data corresponding to a view of the vehicle occupant and to determine their viewing direction based thereon, such as based on the occupant's eye position, or may receive data indicative of the occupant's viewing direction from another sub-system of the vehicle. The image data may also be processed to adjust the representation to match a shape of the vehicle's body, for example to adjust for contours in the vehicle's bonnet shape.

The processing device 525 controls the display device 520, 530 to display the representation. The representation may be based on one or both of the generated graphic representation of the one or more components of the vehicle, such as the vehicle's wheels 350, or the image data received from the one or more cameras 410, 420. As described above the display device 520, 530, in one embodiment, comprises a projector means for projecting light 540 such as a projection device 520 which is operably controlled by the processing device 525 to project the representation by emitting light toward an optical combiner 530. The projection device 520 and combiner 530 together form a head-up display (HUD). When no light is being emitted by the projection device 520 the combiner 530 is generally imperceptible to the passenger of the vehicle, but when light 540 is projected from the projection device 520 and hits the combiner 530 an image is viewed thereon by the passenger. The combiner 530 is positioned such that an image viewed thereon by the passenger appears to overlie a portion of the vehicle's body as the bonnet 511. That is the image appears above the bonnet 511.

Figure 6:
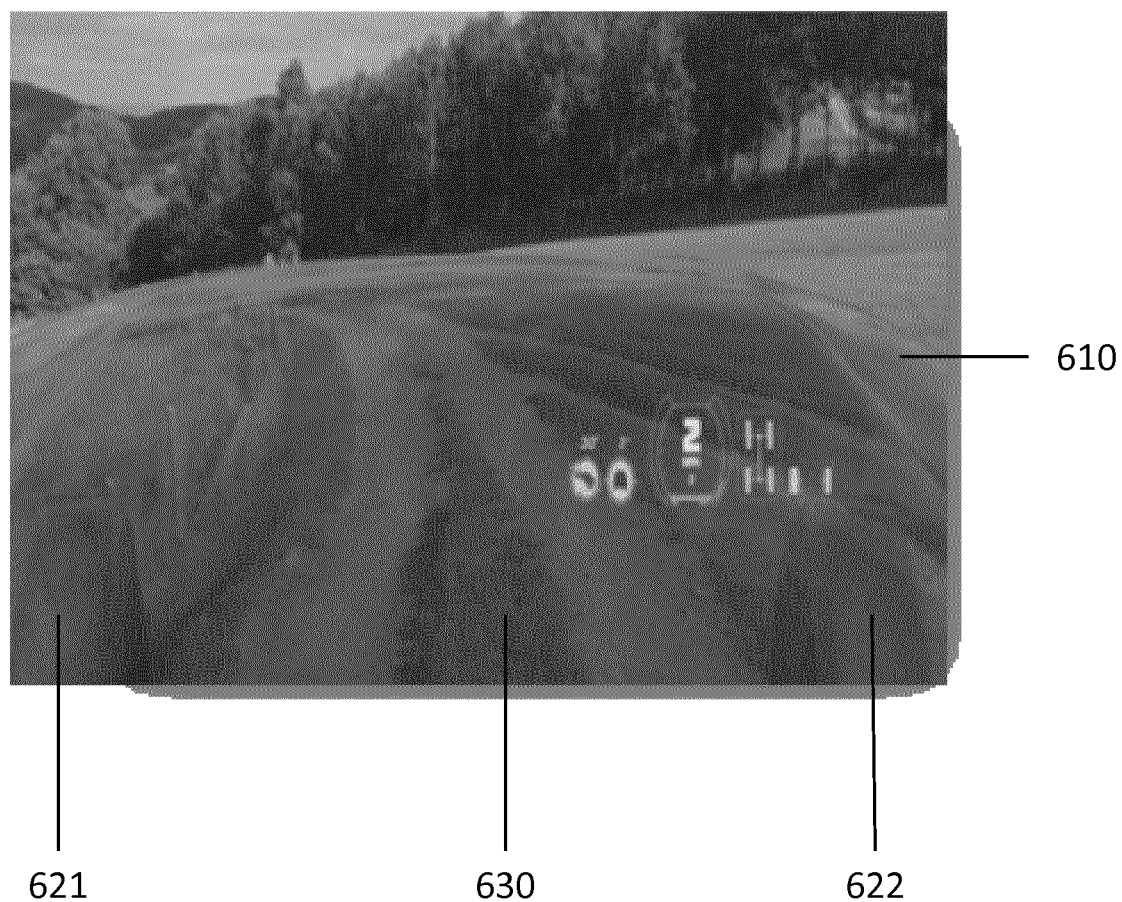
FIG. 6 is an image showing operation of an embodiment of the invention.

FIG. 6 illustrates operation of an embodiment of the invention. FIG. 6 is a view through a windscreen of a vehicle according to an embodiment of the invention. In FIG. 6 a bonnet 610 of the vehicle is visible. Displayed so as to overlie the bonnet is a representation of first 621 and second 622 wheels of the vehicle. Also displayed is an image 630 of terrain obscured from view by the vehicle, in particular by the bonnet 610 of the vehicle. Since the vehicle is inclined backwards in FIG. 6 a roadway along which the vehicle is travelling is entirely obscured from the driver's view at a current location due to the incline and a forward extension of the bonnet 610. However the displayed representation allows the driver to appreciate a location and direction of the vehicle's wheels 621, 622 and a position and direction of the roadway on which the vehicle is travelling, which is particularly useful for off-road driving.

In the above described embodiments, an image is displayed to overlie an external portion of the vehicle. In other embodiments of the vehicle, which will be explained with reference to FIGS. 7 to 9, an image is displayed so as to also overlie at least a portion of an interior of the vehicle.

Figure 7:
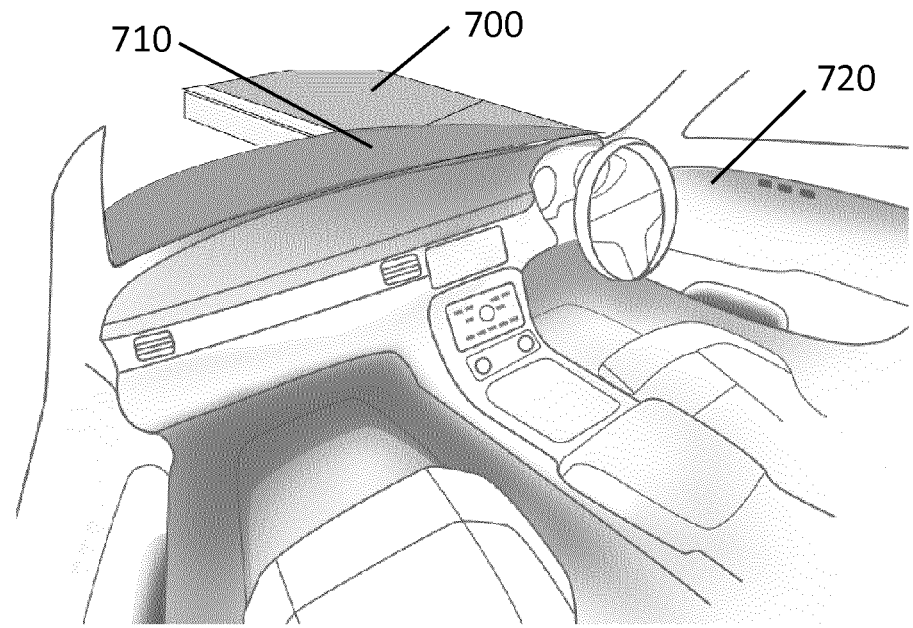
FIG. 7 is an illustration of a view from within a conventional vehicle.

Referring to FIG. 7, which shows a view from within a conventional vehicle, it can be appreciated that a view 700 external to the vehicle is obscured by both the vehicle's body i.e. external to a passenger compartment of the vehicle, in this case by the bonnet 710 and also by an interior of the vehicle i.e. an interior of a door 720 of the vehicle.

Figure 8:
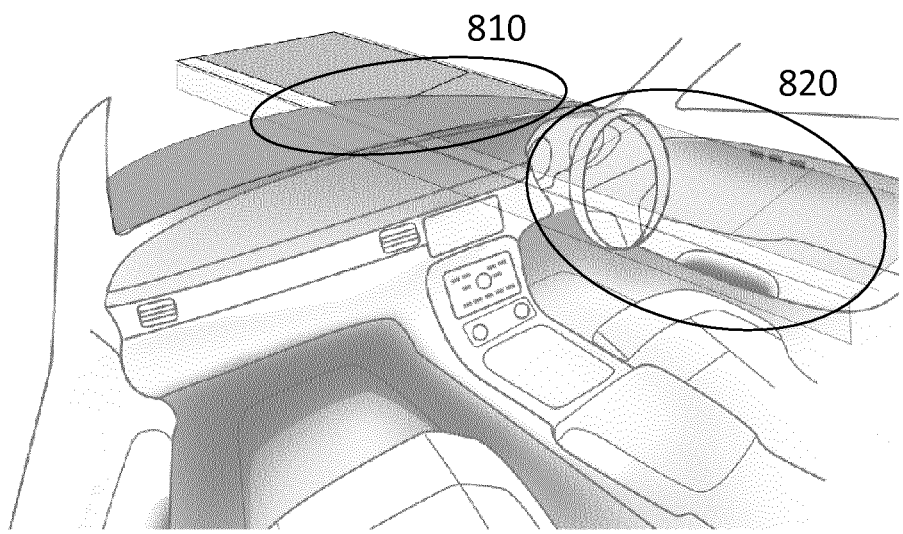
FIG. 8 is an illustration of a view from within a vehicle according to an embodiment of the invention.

Referring to FIG. 8, in order to address the above problem some embodiments comprise, in addition to a head up display means for displaying an image for viewing in an external view 810 i.e. when the viewer is looking outward from the interior of the vehicle, an interior display means for providing an image 820 interior to the vehicle for displaying one or both of image data and/or a representation of one or more components of the vehicle. The interior display means may comprise at least one projection device for projecting an image onto interior surfaces of the vehicle. The interior surfaces may comprise a dashboard, door interior or other interior surfaces of the vehicle. The projection device may be arranged in an elevated position within the vehicle to project the images downward onto the interior surfaces of the vehicle. The head-up display means and interior display means may be both communicatively coupled to a control device such as that illustrated in FIG. 5, which is arranged to divide image data for display there-between. As can be appreciated from FIG. 8 an image produced jointly between the head-up display means and interior display means provides a greater view of objects external to the vehicle. The view may be appreciated not only generally ahead of the driver, but also to a side of the driver or passenger when images are projected onto interior surfaces of the vehicle indicative of image data external to the vehicle and/or one or more components of the vehicle.

In the interests of clarity, the view ahead of the driver may be defined in terms of the direction of travel of vehicle. For example, if the vehicle is travelling in a forward direction then the view ahead of the driver shall be taken to be in front, or forward, of the vehicle; whereas, if the vehicle is travelling in a reverse direction then the view ahead of the driver shall be taken to be behind, or rearward, of the vehicle. In this latter example images are projected onto interior surfaces towards the rear of the vehicle cabin, without limitation on the rearward passenger seats and/or on the interior of the rear tailgate.

Figure 9:
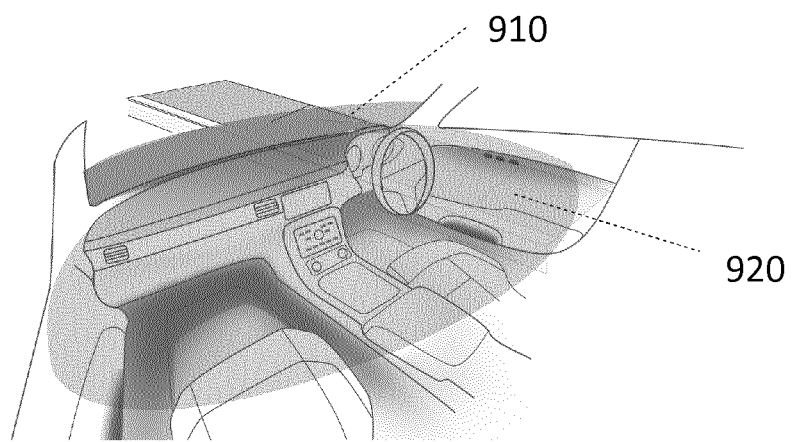
FIG. 9 is an illustration of a vehicle according to an embodiment of the invention.
Figure 10:
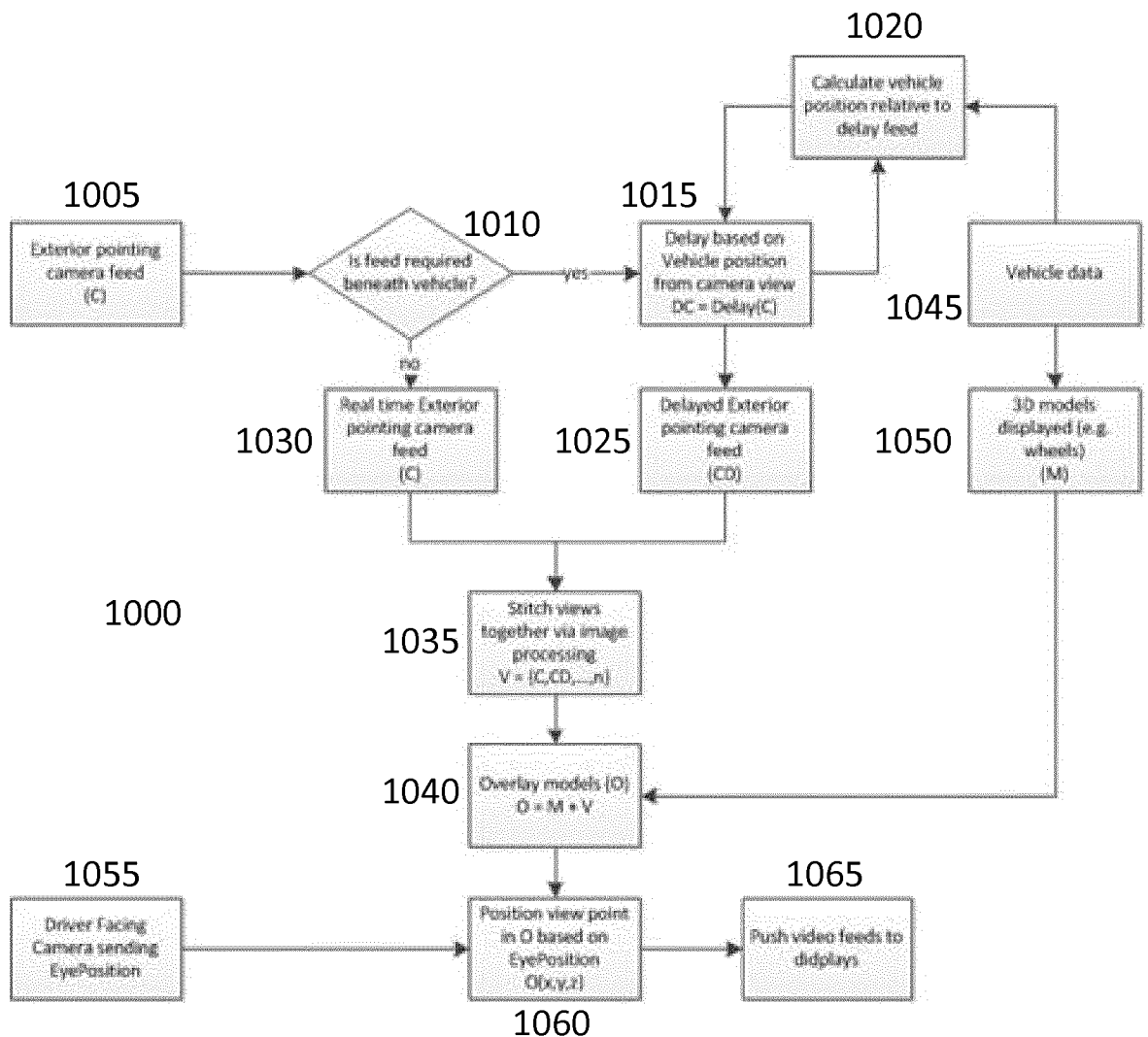
FIG. 10 illustrates a method according to another embodiment of the invention.

Referring to FIG. 9 a region of image display of the head-up display 910 and interior projection means 920 is shown. The head-up display means is arranged to display images in a lower region 910 of a windscreen of the vehicle, whilst the interior projection means is arranged to project images onto interior surfaces of a forward region of the vehicle interior. The region may comprise a dashboard, interior door surfaces and other surfaces around occupant seating positions within the vehicle FIG. 10 illustrates a method 1000 according to a further embodiment of the invention. The method 1000 is a display method for use in a vehicle. The method displays a graphical representation of at least one component of the vehicle having one or more characteristics based on the information associated with the vehicle and a representation of the image data, wherein the display is arranged to overlie a portion of the vehicle such that the representation is indicative of the vehicle being at least partly transparent.

The method comprises a step 1005 in which image data (C) from one or more cameras is obtained. The image data may be provided from one or more cameras facing in a generally forward direction of the vehicle, as previously explained. One or more cameras may be arranged to view in a downward direction forward of the vehicle at a viewing point a predetermined distance ahead of the vehicle. The image data from these one or more cameras is required if it is desired to provide image data for a region generally beneath the vehicle.

In step 1010 it is determined whether image data from the one or more cameras pointing generally downward is required. Step 1010 may be considered as determining whether real time image data can be utilised, such as from a generally downward directed camera. If only image data from a generally forward directed camera is provided then a delay is introduced, as will be described. If such image data is required then the method moves to step 1015.

In step 1015 a delay time is determined based on a distance between a position of the vehicle and the point the predetermined distance ahead of the vehicle at which the one or more cameras viewing in a downward direction are directed. For example, the distance may be 5 m although it will be realised that this is merely an example. The delay time may correspond to a time required for the vehicle to pass over the viewing point of the camera. The delay time is applied in step 1025 to image data from the one or more downward cameras to delay the image data and to provide delayed camera image data (CD) 1025.

In step 1020, with which step 1015 loops, a position of the vehicle with respect to delayed image data is calculated. The position of the vehicle is calculated based on data 1045 from the vehicle, such as indicative of a speed of the vehicle. The position is utilised in order to determine the correct delay time in step 1015.

If, however, in step 1010 image data from one or more cameras pointing generally downward is not required, then the method moves to step 1030 where image data (C) from only one or more outwardly directed cameras is utilised.

In step 1035, in embodiments comprising a plurality of cameras, the image data from the plurality of cameras is combined. It will be appreciated that a need to combine image data from multiple cameras may not exist in embodiments utilising only one camera and therefore step 1035 is omitted. In embodiments utilising a plurality of cameras the image data from the plurality of cameras is combined to form a unitary image data stream. The image data may be combined as V=(C, CD, . . . n) where V is the combined image data stream and, as noted above, C is image data from an outward facing camera and CD is the delayed camera image data. It will be appreciated that further cameras may be utilised.

In step 1050, which may be performed in parallel with other steps of the method, a graphical representation (M) of at least one component of the vehicle is generated.

The at least one component has one or more characteristics based on the data 1045 from the vehicle, such as indicative of a speed of the vehicle, a steering angle of the vehicle, an engine speed of the vehicle. It will be realised that other data may be utilised appropriate for the representation(s) to be generated. The representation may be a steering system of the vehicle, one or more wheels of the vehicle, a suspension of the vehicle, an engine of the vehicle. It will be realised that other representations may be generated.

In step 1040 the graphical representation (M) of the at least one component of the vehicle is combined with the image data (V) provided from step 1035. Step 1040 provides, as an output an overlay (O) of the representations on the video data O=M+V. Thus the representation(s) appear combined with the image data.

In some embodiments of the method a viewing direction of an occupant of the vehicle is determined. The occupant may be the driver of the vehicle. A camera is arranged to provide image data of the occupant from which the viewing direction of the occupant is determined. The viewing direction is determined from an eye position of the occupant (optionally driver) in step 1055, although it will be realised that this step may be omitted from some embodiments of the method 1000.

In step 1060 one or more image processing operations is performed to adjust the output (O) of step 1040 based on the viewing direction. The one or more image processing operations are performed to adjust a view point O(x, y) of the combination of the image data and generated representations appropriate for the occupant.

In step 1065 the output of step 1060 is displayed. The output comprises image data and one or more generated representations of at least one component of the vehicle. Step 1065 may comprise providing the output to a head-up display or a combination of a head-up display and one or more projection devices. Thus step 1065 may comprise dividing the output between the display devices. As a result of step 1065 the image data and representations are displayed so as to overlie a portion of the vehicle, such that the representation is indicative of the vehicle being at least partly transparent. The portion of the vehicle may comprise an exterior portion, such as the bonnet of the vehicle, and an interior portion of the vehicle.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Further aspects of the invention are set out in the following numbered paragraphs:

1. A display method for use in a vehicle, comprising obtaining information associated with a vehicle or image data for a region ahead of the vehicle, and displaying one or more of a graphical representation of at least one component of the vehicle having one or more characteristics based on the information associated with the vehicle, or a representation of the image data, wherein the one or more displayed representation is arranged to overlie a portion of the vehicle to be indicative of a portion of the vehicle being at least partly transparent.
2. The method of paragraph 1, wherein the representation is translucently displayed.
3. The method of paragraph 1, wherein the representation is arranged to overlie an external portion of the vehicle.
4. The method of paragraph 3, wherein the external portion is a bonnet of the vehicle.
5. The method of paragraph 1, wherein the representation is arranged to overlie the portion of the vehicle at least from a point of view of a driver of the vehicle.
6. The method of paragraph 1, wherein the representation is displayed on a head-up display device.
7. The method of paragraph 1, wherein the representation is arranged to overlie an interior portion of the vehicle.
8. The method of paragraph 7, wherein the interior portion of the vehicle comprises one or more of a dashboard of the vehicle and a door of the vehicle.
9. The method of paragraph 7, comprising projecting the representation onto the interior portion of the vehicle.
10. The method of paragraph 1, wherein the information associated with the vehicle is information associated with the at least one component of the vehicle.
11. The method of paragraph 1, wherein the at least one component of the vehicle comprises a steering system of the vehicle, one or more wheels of the vehicle, a suspension of the vehicle or an engine of the vehicle.
12. The method of paragraph 1, wherein the information associated with the vehicle is obtained from a communication bus of the vehicle.
13. The method of paragraph 1, wherein the image data is obtained from one or more cameras associated with the vehicle.
14. The method of paragraph 13, wherein one or more of the cameras are arranged to view forward of the vehicle.
15. The method of paragraph 13, wherein one or more of the cameras are arranged to view a region a predetermined distance ahead of the vehicle.
16. The method of paragraph 13, wherein the one or more cameras are arranged to view in a downward direction.
17. The method of paragraph 1, comprising processing the image data such that the representation of the image data is generally aligned with a view from the vehicle.
18. The method of paragraph 17, wherein the view from the vehicle is a driver's view from the vehicle.

19. The method of paragraph 18, wherein the driver's view is determined from image data of the driver.
20. The method of paragraph 17, wherein the representation of the image data is displayed so as to substantially spatially align with the region ahead of the vehicle from a point of view of an occupant within the vehicle, optionally the driver of the vehicle.
21. The method of paragraph 1, comprising processing the image data to introduce a delay into at least a portion of the image data.
22. The method of paragraph 21, comprising determining the delay based on information associated with the vehicle, optionally wherein the information is indicative of a speed of the vehicle.
23. A display apparatus for use with a vehicle, comprising a display device arranged to display information such that the displayed information overlies a portion of the vehicle, and a processing device arranged to determine information associated with the vehicle or to receive image data for a region ahead of the vehicle and to cause the display device to display one or more of a graphical representation of at least one component of the vehicle having one or more characteristics based on the information associated with the vehicle, or a representation of the image data.
24. The apparatus of paragraph 23, wherein the display device is arranged to translucently display information thereon.
25. The apparatus of paragraph 24, wherein the display device is arranged to translucently display the representation so that the portion of the vehicle's body is partly visible.
26. The apparatus of paragraph 23, wherein the display device is arranged to display the representation to overlie at least a portion of a bonnet of the vehicle.
27. The apparatus of paragraphs 23, wherein the representation is displayed to overlie the portion of the vehicle from a point of view of a driver of the vehicle.
28. The apparatus of paragraph 23, wherein the display device comprises a head up display.
29. The apparatus of paragraph 23, wherein the display device comprises a projection device arranged to project at least a portion of the representation onto an interior of the vehicle.
30. The apparatus of paragraph 23, wherein the information associated with the vehicle is information associated with the at least one component of the vehicle.
31. The apparatus of paragraph 23, wherein the at least one component of the vehicle comprises a steering system of the vehicle, one or more wheels of the vehicle, a suspension of the vehicle or an engine of the vehicle.
32. The apparatus of paragraph 23, comprising one or more cameras arranged to output the image data.
33. The apparatus of paragraph 32, wherein one or more cameras are arranged to view ahead of the vehicle.
34. The apparatus of paragraph 32 wherein one or more of the cameras are arranged to view a region a predetermined distance ahead of the vehicle.
35. The apparatus of paragraph 23, wherein the processing device is arranged to process the image data such that the representation of the image data is generally aligned with a view from the vehicle.
36. The apparatus of paragraph 35, wherein the view from the vehicle is a driver's view from the vehicle.
37. The apparatus of paragraph 36, wherein the processing device is arranged to receive image data of the driver and to determine the driver's view based thereon.
38. The apparatus of paragraph 35, wherein the representation of the image data is displayed so as to substantially spatially align with the region ahead of the vehicle from a point of view of an occupant within the vehicle, optionally the driver of the vehicle.
39. The apparatus of paragraph 23, wherein the processing device is arranged to process the image data to introduce a delay into the representation of the image data.
40. The apparatus of paragraph 28, wherein the head up display is arranged in a lower portion of a windscreen of the vehicle.
41. A vehicle comprising the apparatus of paragraph 23.

The invention claimed is:
1. A display method for use in a vehicle, comprising:
obtaining image data for a region ahead of the vehicle from one or more cameras mounted at a front of the vehicle lower than a plane of a bonnet of the vehicle;
processing the image data to introduce a delay into at least a portion of the image data, wherein the image data is obtained from one or more further cameras;
displaying a representation of the image data, wherein the displayed representation is indicative of a view obscured by the vehicle;
combining delayed image data obtained from said one or more cameras with real-time image data obtained from said one or more further cameras to form a unitary image data stream; and
displaying a representation of the unitary image data stream, wherein the displayed representation is indicative of a view obscured by the vehicle, and wherein the portion of the unitary image data stream corresponding to delayed image data is indicative of a view generally beneath the vehicle.
2. The method of claim 1, wherein the one or more cameras are mounted behind a grille of the vehicle.
3. The method of claim 1, wherein the one or more cameras are arranged to view in a downward direction.
4. The method of claim 1, comprising: obtaining information associated with a vehicle; and
displaying a graphical representation of at least one component of the vehicle having one or more characteristics based on the information associated with the vehicle, wherein the displayed representation is indicative of a view obscured by the vehicle.
5. The method of claim 4, wherein the at least one component of the vehicle is a mechanical component of the vehicle; optionally the mechanical component is one of a steering system of the vehicle, one or more wheels of the vehicle, a suspension of the vehicle or an engine of the vehicle.
6. The method of claim 4, wherein the graphical representation is translucently displayed.
7. The method of claim 1, comprising: obtaining information associated with the vehicle; and
displaying a graphical representation of at least one component of the vehicle having one or more characteristics based on the information associated with the vehicle wherein the displayed representation is indicative of a view obscured by the vehicle;
wherein the graphical representation is translucently displayed and wherein the at least one component is one or more wheels of the vehicle.
8. The method of claim 1, further comprising determining the delay based on information indicative of a speed of the vehicle.

9. A display apparatus for use with a vehicle, comprising:
a display arranged to display information such that the displayed information is indicative of a view obscured by the vehicle; and
a processor arranged to:
receive image data for a region ahead of the vehicle from one or more cameras mounted at a front of the vehicle lower than a plane of a bonnet of the vehicle,
process the image data to introduce a delay into at least a portion of the image data,
obtain image data from one or more further cameras,
combine delayed image data obtained from said one or more cameras with real-time image data obtained from said one or more further cameras to form a unitary image data stream, and
cause the display to display a representation of the unitary image data stream, wherein the displayed representation is indicative of a view obscured by the vehicle, and wherein the portion of the unitary image data stream corresponding to delayed image data is indicative of a view generally beneath the vehicle.

10. The apparatus claim 9, wherein the processor is arranged to determine information associated with the vehicle and to cause the display to display a graphical representation of at least one component of the vehicle having one or more characteristics based on the information associated with the vehicle.

11. The apparatus of claim 10, wherein the graphical representation is translucently displayed.

12. The apparatus of claim 9, wherein the processor is arranged to determine information associated with the vehicle and to cause the display to display a graphical representation of at least one component of the vehicle having one or more characteristics based on the information associated with the vehicle, wherein the graphical representation is translucently displayed and wherein the at least one component is one or more wheels of the vehicle.

13. The apparatus of claim 9, wherein the processor is arranged to determine the delay based on information indicative of a speed of the vehicle.

14. A vehicle comprising the apparatus of claim 9, one or more cameras mounted at a front of the vehicle lower than a plane of a bonnet of the vehicle to output the image data, and one or more further cameras.

* * * * *